US012703417B2

(12) United States Patent
Kim

(10) Patent No.: US 12,703,417 B2
(45) Date of Patent: Aug. 11, 2026

(54) VEHICLE STEERING COLUMN

(71) Applicant: HL MANDO CORPORATION, Gyeonggi-do (KR)

(72) Inventor: Hyun Kim, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 0 days.

(21) Appl. No.: 19/203,043

(22) Filed: May 8, 2025

(65) Prior Publication Data

US 2025/0346281 A1 Nov. 13, 2025

(30) Foreign Application Priority Data

May 8, 2024 (KR) ........................ 10-2024-0060245

(51) Int. Cl.
*B62D 1/183* (2006.01)
*B62D 1/181* (2006.01)

(52) U.S. Cl.
CPC ............. *B62D 1/183* (2013.01); *B62D 1/181* (2013.01)

(58) Field of Classification Search
CPC ........ B62D 1/183; B62D 1/181; B62D 1/184; B62D 1/185
See application file for complete search history.

(56) References Cited

U.S. PATENT DOCUMENTS

| | | | | |
|---|---|---|---|---|
| 3,302,478 A * | 2/1967 | Pauwels | B62D 1/183 | 280/775 |
| 4,900,059 A * | 2/1990 | Kinoshita | B62D 1/181 | 74/424.89 |
| 5,722,300 A * | 3/1998 | Burkhard | F16D 3/06 | 384/42 |
| 9,126,624 B2 * | 9/2015 | Iwakawa | B62D 1/181 | |
| 10,385,930 B2 * | 8/2019 | Magnus | F16D 28/00 | |
| 10,745,042 B2 * | 8/2020 | Shin | B62D 1/04 | |
| 11,318,981 B1 * | 5/2022 | Weselý | B62D 1/185 | |
| 2017/0369091 A1 * | 12/2017 | Nash | B62D 1/185 | |
| 2018/0148084 A1 * | 5/2018 | Nash | B60Q 9/00 | |
| 2021/0024119 A1 * | 1/2021 | Ito | B62D 1/195 | |
| 2023/0043788 A1 * | 2/2023 | Ponikiewski | B62D 1/181 | |

FOREIGN PATENT DOCUMENTS

| | | |
|---|---|---|
| KR | 10-2006-0091487 | 8/2006 |
| KR | 10-2018-0048054 | 5/2018 |
| KR | 10-2019-0012672 | 2/2019 |

* cited by examiner

*Primary Examiner* — Jason D Shanske
*Assistant Examiner* — Shams Dhanani
(74) *Attorney, Agent, or Firm* — WOMBLE BOND DICKINSON (US) LLP

(57) ABSTRACT

A vehicle steering column may include a hollow lower tube coupled and fixed to a mounting bracket, a hollow middle tube coupled to an inner side of the lower tube and sliding in an axial direction, a hollow upper tube having an inner side to which a steering shaft is rotatably coupled and an outer side to which the middle tube is coupled to slide in the axial direction, and a tube support member coupled to an inner side of a lower end portion of the lower tube and supporting lower end portions of the middle tube and the upper tube.

20 Claims, 10 Drawing Sheets

131b
131a
131
101
130
140
113b
154a
154b
154
156a
156b
156
141
141a
141b
120
113a
153
151
152
125
155
155a
123
105
106a
105s
106
101s

VEHICLE STEERING COLUMN

CROSS-REFERENCE TO RELATED APPLICATIONS

This application claims the priority of Korean Patent Application No. 10-2024-0060245 filed on May 8, 2024, in the Korean Intellectual Property Office, the disclosure of which is incorporated herein by reference.

BACKGROUND

Field

The present embodiments relate to a vehicle steering column capable of performing a stow movement for introducing a steering wheel into or out of a dashboard, together with a telescopic movement for adjusting an axial length of the steering column.

Description of the Related Art

Typically, a vehicle steering column includes telescope and tilt functions, which allow a driver to adjust the protrusion and tilt angle of a steering wheel to suit his/her height and body type, allowing for smooth steering operation.

Recently, a steer-by-wire type steering device has been developed and applied that uses an electric motor, such as a motor, to steer the vehicle instead of a connecting part for mechanically connecting parts such as a shaft, universal joint, or pinion shaft between a steering wheel and a wheel.

And, as the steer-by-wire type steering device has been developed, a steering column is being developed that enable autonomous driving that allows a vehicle to reach its destination without a driver having to operate the steering wheel, accelerator pedal, or brakes, and there is a demand to secure wider space for the convenience of the driver sitting in the driver's seat during the autonomous driving.

To this end, research is being conducted on ways to increase the telescopic stow-in and stow-out distances of the steering shaft, or to increase a stow distance for introducing the steering wheel into or out of the dashboard.

However, as the stow-in and stow-out distances of the vehicle steering column increase, stow-in and stow-out speeds also increase, and there is a problem that rebound of an upper tube or middle tube occurs at the point of a full stow-in of the steering column, making it difficult to secure sufficient stability and convenience for the driver.

Accordingly, there is an increasing need for research on a vehicle steering column that may perform operation quickly and stably while increasing the stow-in and stow-out distances of the vehicle steering column and ensuring both driver safety and convenience.

SUMMARY

The present embodiments have been devised in consideration of the background described above, and relate to a vehicle steering column that may more quickly and stably perform a telescopic movement for adjusting an axial length of a vehicle steering column and a stow movement for introducing a steering wheel into or out of a dashboard.

In addition, the present embodiments relate to a vehicle steering column that may provide sufficient stability and convenience to a driver by performing stable stow-in and stow-out operations by preventing rebound of an upper tube or a middle tube at the point of full stow-in of the steering column.

According to the present embodiments, there may be provided a vehicle steering column including: a lower tube fixed to a mounting bracket; a middle tube slidably coupled to an inner side of the lower tube and configured to slidable in an axial direction of the vehicle steering column; a upper tube having an inner side to which a steering shaft is rotatably coupled and an outer side to which the middle tube is coupled, the upper tube configured to be slidable in the axial direction of the vehicle steering column; and a tube support member coupled to an inner side of a lower end portion of the lower tube and configured to support lower end portions of the middle tube and the upper tube.

In the present embodiments, the lower end portion of the tube has a cylinder portion through which the steering shaft passes, the cylinder portion has a flange radially extending from an inner surface of the cylinder portion, and the tube support member may be coupled to the flange of the cylinder portion of the lower tube.

In the present embodiments, the tube support member may include a ring-shaped outer support portion configured to support the lower end portion of the middle tube, a ring-shaped inner support portion disposed the ring-shaped outer support portion and configured to support the lower end portion of the upper tube, a bulkhead having a shaft hole through which the steering shaft passes and connecting the ring-shaped outer support portion and the ring-shaped inner support portion, and a flange fastening portion extending axially from the bulkhead and having a groove into which the flange of the cylinder portion of the lower tube is inserted.

In the present embodiments, the tube support member may have a first cut portion in which the ring-shaped outer support portion, the ring-shaped inner support portion, and the bulkhead are cut.

In the present embodiments, the flange fastening portion of the tube support member may have one or more second cut portions.

In the present embodiments, the ring-shaped outer support portion of the tube support member has an outer support protrusion protruding radially inward from an inner surface of the ring-shaped outer support portion, and the middle tube has a middle tube protrusion supported by the outer support protrusion of the tube support member and protruding from an outer surface of the lower end portion of the middle tube.

In the present embodiments, the outer support protrusion of the ring-shaped outer support portion of the tube support member may include an outer locking portion extending from the inner surface of the ring-shaped outer support portion of the tube support member in a direction toward an axis of the steering shaft, and an inclined surface extending from an end of the outer locking portion to the inner surface of the ring-shaped outer support portion.

In the present embodiments, the ring-shaped inner support portion of the tube support member has an inner support protrusion protruding radially outward from the outer surface of the ring-shaped inner support portion, and the upper tube has an upper tube protrusion supported by the inner support protrusion of the tube support member and protruding from an inner surface of the lower end portion of the upper tube.

In the present embodiments, the inner support protrusion of the ring-shaped inner support portion of the tube support member may include an inner locking portion extending from the outer surface of the ring-shaped inner support portion of the tube support member in a direction away from an axis of the steering shaft, and an inclined surface extending from an end of the inner locking portion to the outer surface of the ring-shaped inner support portion.

In addition, according to the present embodiments, there may be provided a vehicle steering column including: a lower tube fixed to a mounting bracket; a upper tube having an inner side to which a steering shaft is rotatably coupled and an outer side to which the lower tube is coupled, the upper tube configured to be slidable in an axial direction of the vehicle steering column; and a tube support member coupled to an inner side of a lower end portion of the lower tube and configured to support a lower end portion of the upper tube.

In the present embodiments, the lower end portion of the lower tube has a cylinder portion through which the steering shaft passes, the cylinder portion has a flange radially extending from an inner surface of the cylinder portion, and the tube support member may be coupled to the flange of the cylinder portion.

In the present embodiments, the tube support member may include a ring-shaped outer support portion configured to support an outer surface of the upper tube, a ring-shaped inner support portion disposed the ring-shaped outer support portion and configured to support an inner surface of the upper tube, a bulkhead having a shaft hole through which the steering shaft passes and connecting the ring-shaped outer support portion and the ring-shaped inner support portion, and a flange fastening portion extending axially from the bulkhead and having a groove into which the flange of the cylinder portion of the lower tube is inserted.

In the present embodiments, the tube support member may have a first cut portion in which the ring-shaped outer support portion, the ring-shaped inner support portion, and the bulkhead are cut.

In the present embodiments, the flange fastening portion may have one or more second cut portions.

In the present embodiments, the ring-shaped outer support portion of the tube support member has an outer support protrusion protruding radially inward from an inner surface of the ring-shaped outer support portion, and the upper tube has a first protrusion supported by the outer support protrusion of the tube support member and protruding from an outer surface of the lower end portion of the upper tube.

In the present embodiments, the outer support protrusion of the ring-shaped outer support portion of the tube support member may include an outer locking portion extending from the inner surface of the ring-shaped outer support portion of the support member in a direction toward an axis of the steering shaft, and an inclined surface extending from an end of the outer locking portion to the inner surface of the ring-shaped outer support portion.

In the present embodiments, the ring-shaped inner support portion of the tube support member has an inner support protrusion protruding radially outward from the outer surface of the ring-shaped inner support portion, and the upper tube has a second protrusion supported by the inner support protrusion of the tube support member and protruding from an inner surface of the lower end portion of the upper tube.

In the present embodiments, the inner support protrusion of the ring-shaped inner support portion of the tube support member may include an inner locking portion extending from the outer I surface of the ring-shaped inner support portion of the tube support member in a direction away from an axis of the steering shaft, and an inclined surface extending from an end of the inner locking portion to the outer surface of the ring-shaped inner support portion.

In the present embodiments, the ring-shaped outer support portion of the tube support member has an outer support protrusion protruding radially inward from an inner surface of the ring-shaped outer support portion, the upper tube has a first protrusion supported by the outer support protrusion of the tube support member and protruding from an outer surface of the lower end portion of the upper tube, the ring-shaped inner support portion of the tube support member has an inner support protrusion protruding radially outward from the outer surface of the ring-shaped inner support portion, and the upper tube has a second protrusion supported by the inner support protrusion of the tube support member and protruding from an inner surface of the lower end portion of the upper tube.

In the present embodiments, the outer support protrusion of the ring-shaped outer support portion of the tube support member may include an outer locking portion extending from the inner surface of the ring-shaped outer support portion portion of the tube support member in a direction toward an axis of the steering shaft, and first inclined surface extending from an end of the outer locking portion to the inner surface of the ring-shaped outer support portion, and the inner support protrusion of the ring-shaped inner support portion of the tube support member may include an inner locking portion extending from the outer surface of the ring-shaped inner support portion of the tube support member in a direction away from an axis of the steering shaft, and second inclined surface extending from an end of the inner locking portion to the outer surface of the ring-shaped inner support portion.

According to these embodiments, a telescopic movement for adjusting an axial length of the vehicle steering column and a stow movement for introducing the steering wheel into or out of the dashboard can be performed more quickly and stably.

In addition, according to the present embodiments, it is possible to provide sufficient stability and convenience to a driver by performing stable stow-in and stow-out operations by preventing rebound of the upper tube or the middle tube at the point of full stow-in of the steering column.

The effects of the present disclosure are not limited to the aforementioned effects, and other effects, which are not mentioned above, will be apparently understood to a person having ordinary skill in the art from the following description.

The objects to be achieved by the present disclosure, the means for achieving the objects, and the effects of the present disclosure described above do not specify essential features of the claims, and, thus, the scope of the claims is not limited to the disclosure of the present disclosure.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION OF THE EMBODIMENT

Figure 1:
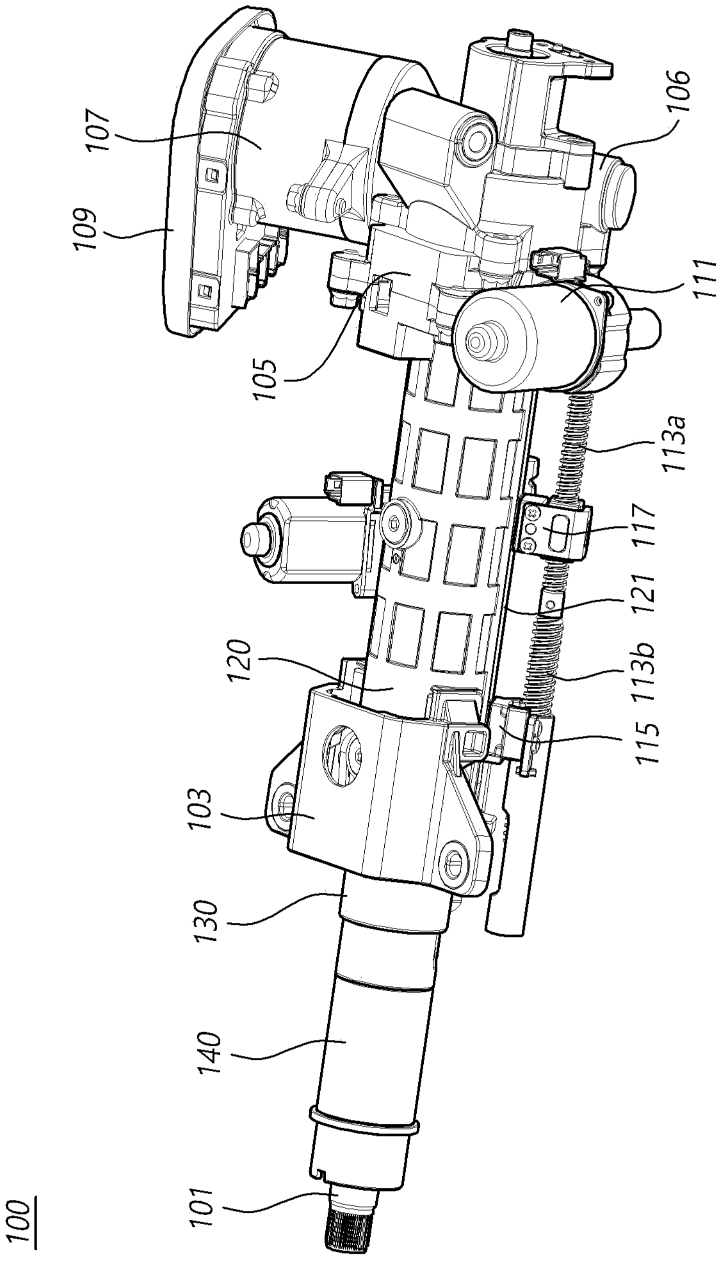
FIG. 1 is a perspective view of a vehicle steering column according to the present embodiments.

In the following description of examples or embodiments of the present disclosure, reference will be made to the accompanying drawings in which it is illustrated by way of illustration specific examples or embodiments that can be implemented, and in which the same reference numerals and signs can be used to designate the same or like components even when they are illustrated in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements or the like, but is used merely to distinguish the corresponding element from other elements.

When it is mentioned that a first element "is connected or coupled to", "contacts or overlaps" or the like a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", or the like each other via a fourth element. Here, the second element may be included in at least one of two or more elements that "are connected or coupled to", "contact or overlap", or the like each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes or the like are mentioned, it should be considered that numerical values for an elements or features, or corresponding information (for example, level, range, or the like) include a tolerance or error range that may be caused by various factors (for example, process factors, internal or external impact, noise, or the like) even when a relevant description is not specified. Further, the term "may" fully encompass all the meanings of the term "can".

Figure 2:
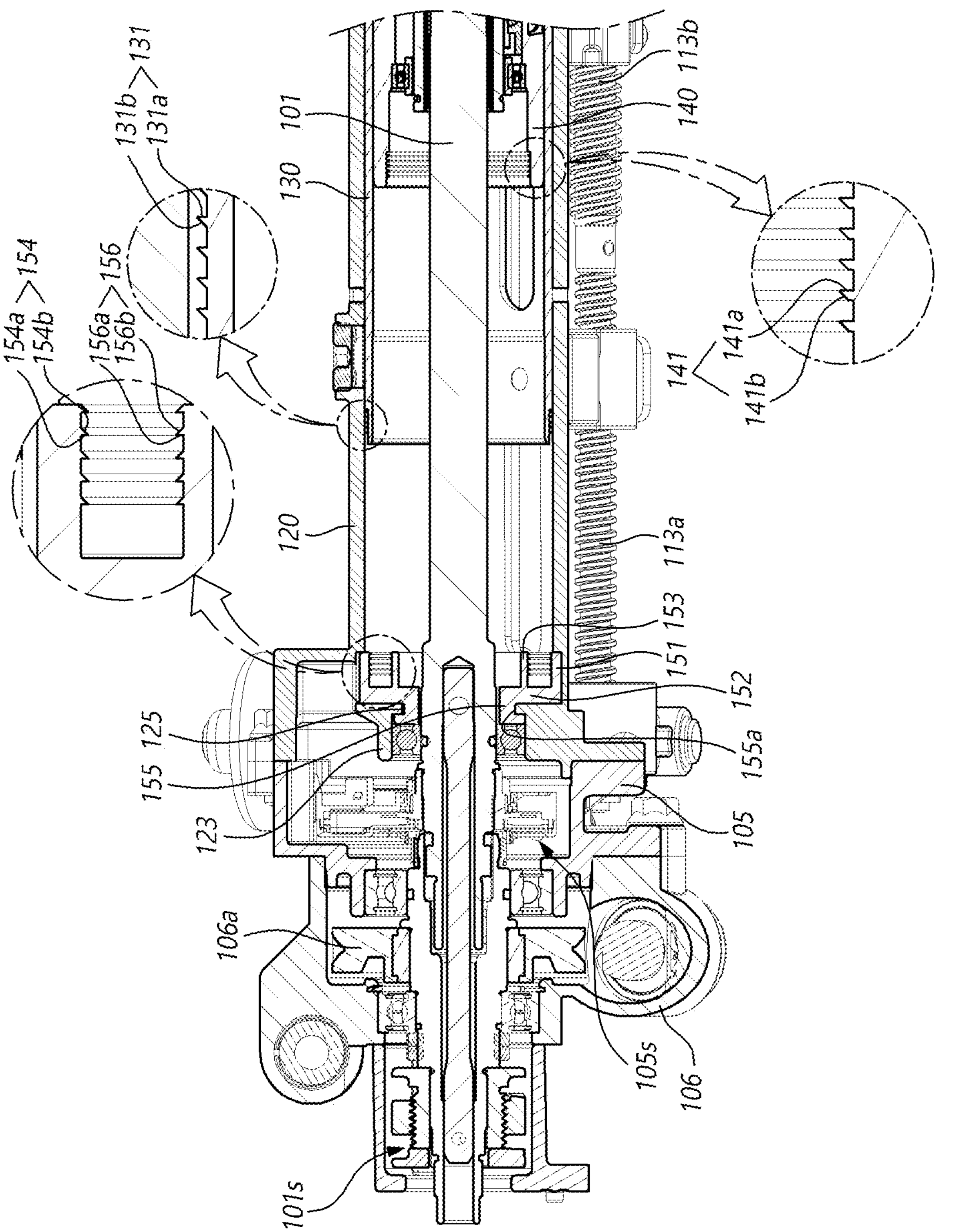
FIG. 2 is a cross-sectional view of the vehicle steering column according to the present embodiments.
Figure 3:
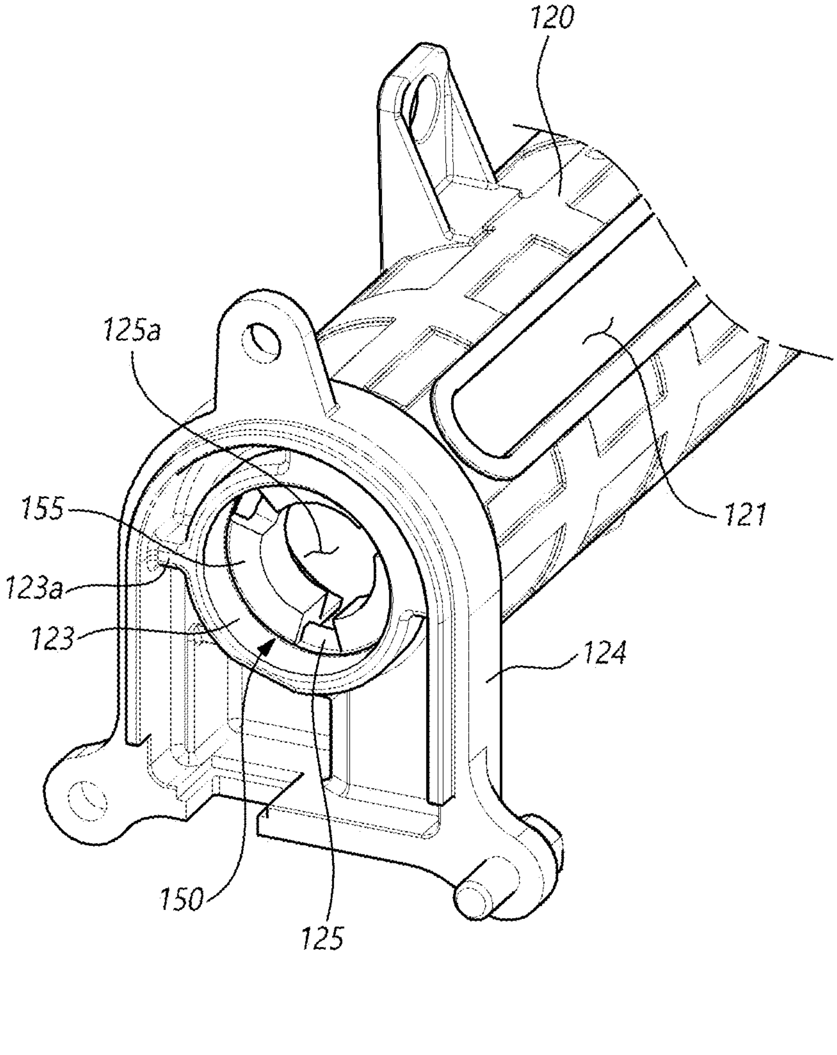
FIGS. 3 to 5 are perspective views of the vehicle steering column according to the present embodiments.
Figure 4:
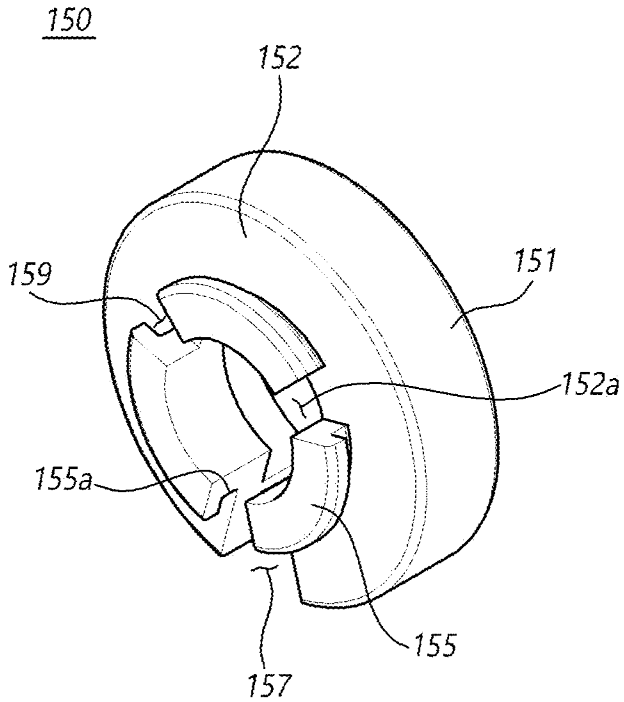
Figure 5:
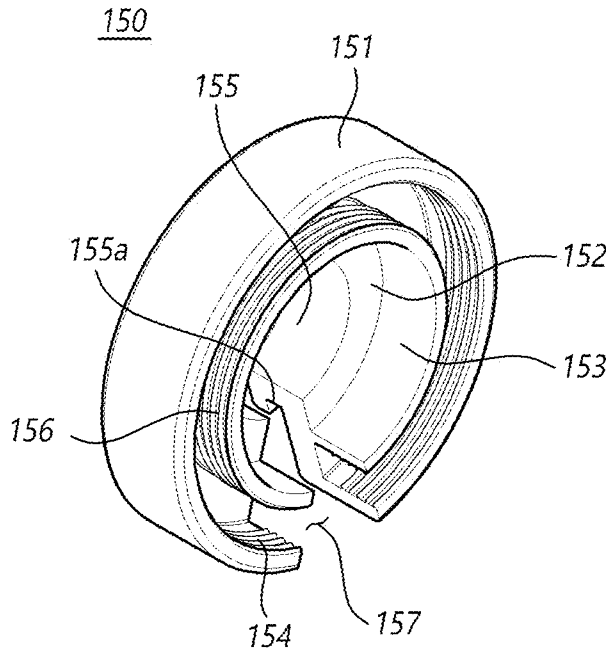
Figure 6:
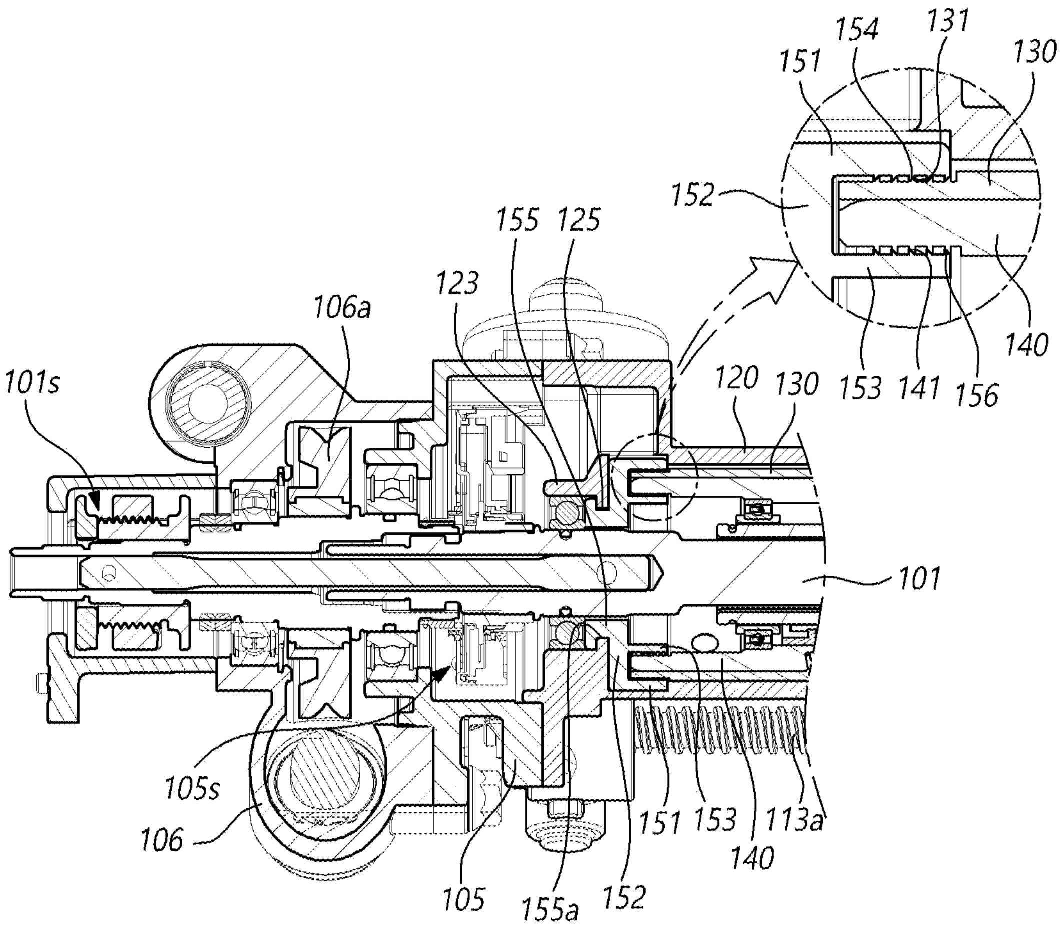
FIG. 6 is a cross-sectional view of the vehicle steering column according to the present embodiments.
Figure 7:
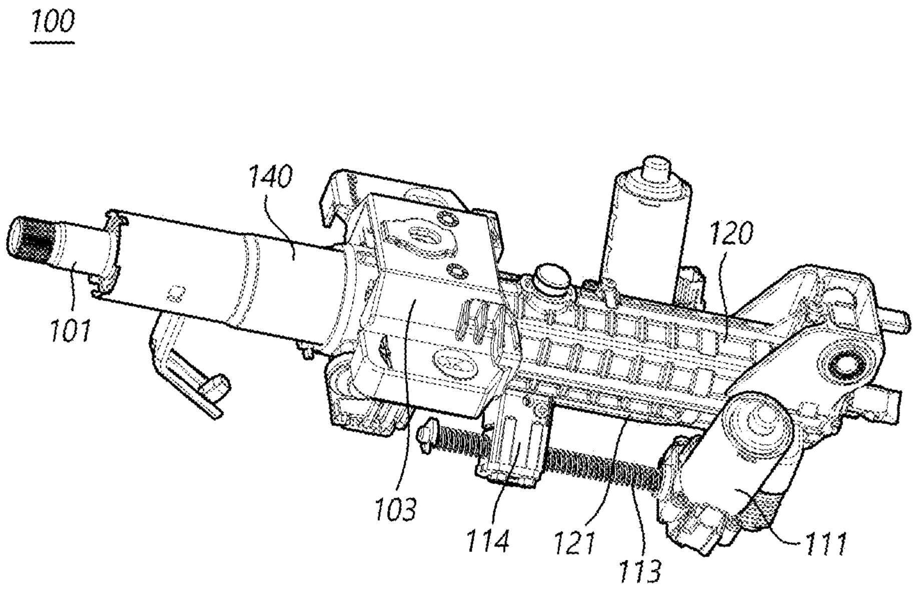
FIG. 7 is a perspective view of a vehicle steering column according to the present embodiments.
Figure 8:
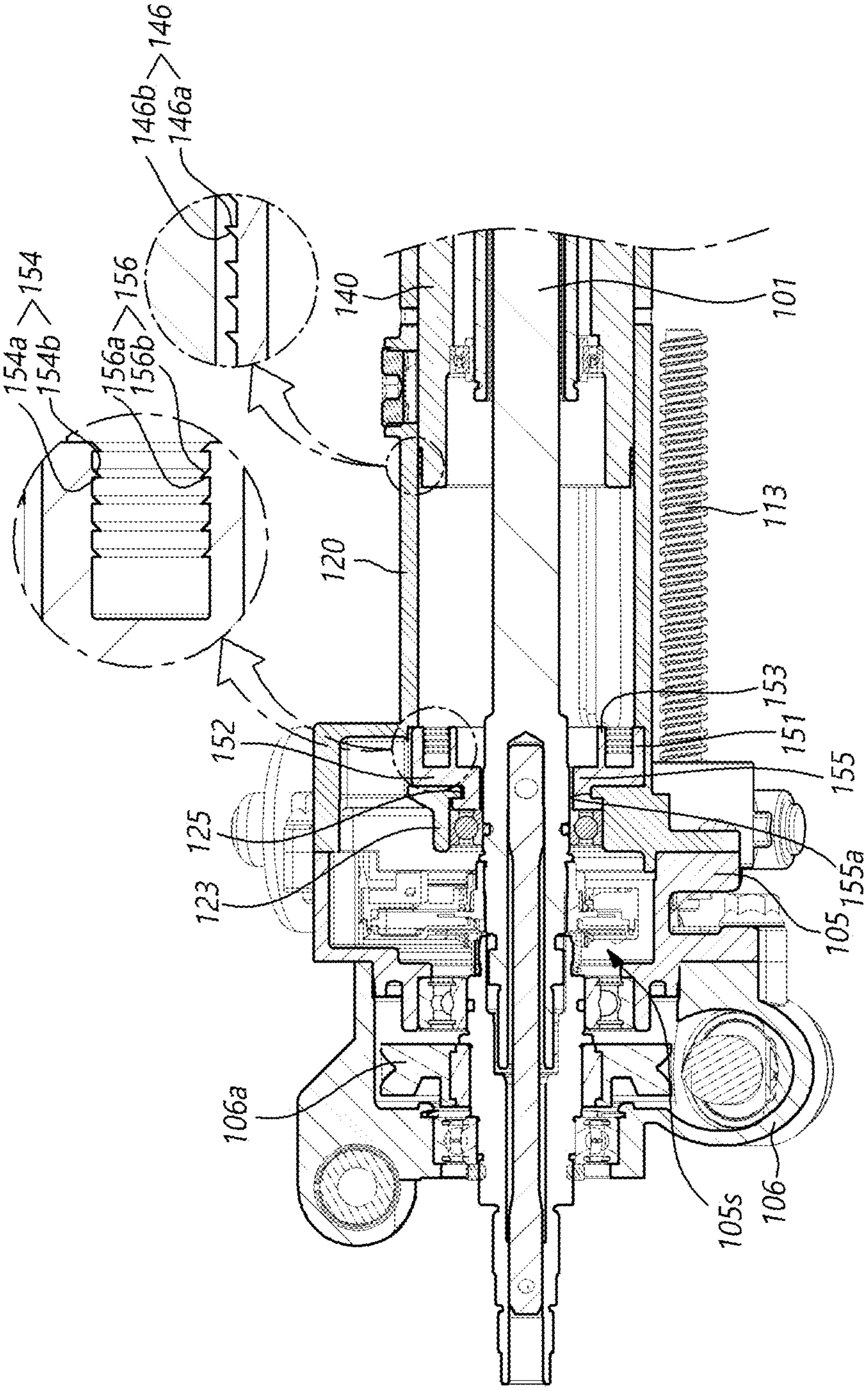
FIGS. 8 to 10 are cross-sectional views of the vehicle steering column according to the present embodiments.
Figure 9:
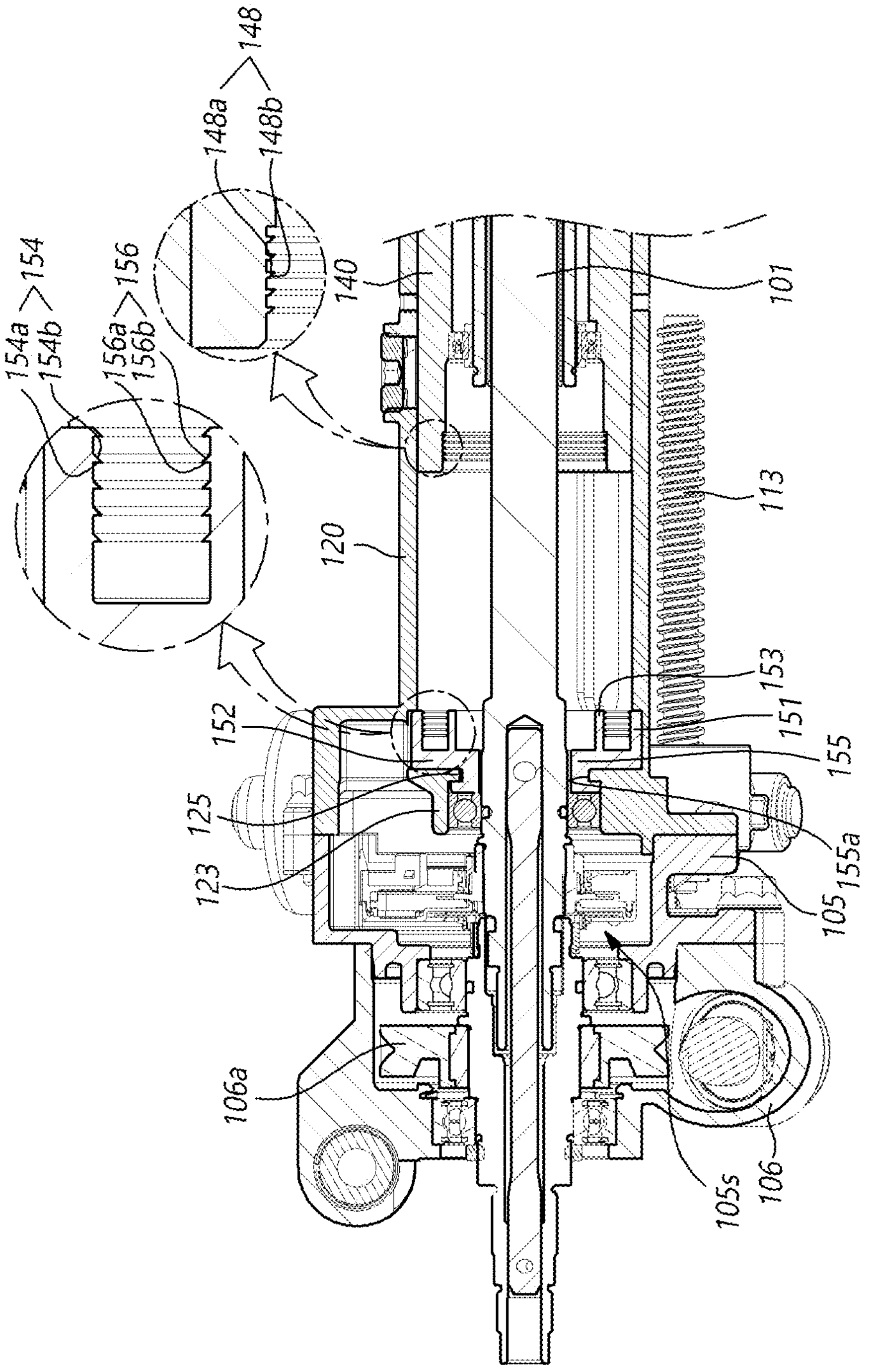
Figure 10:
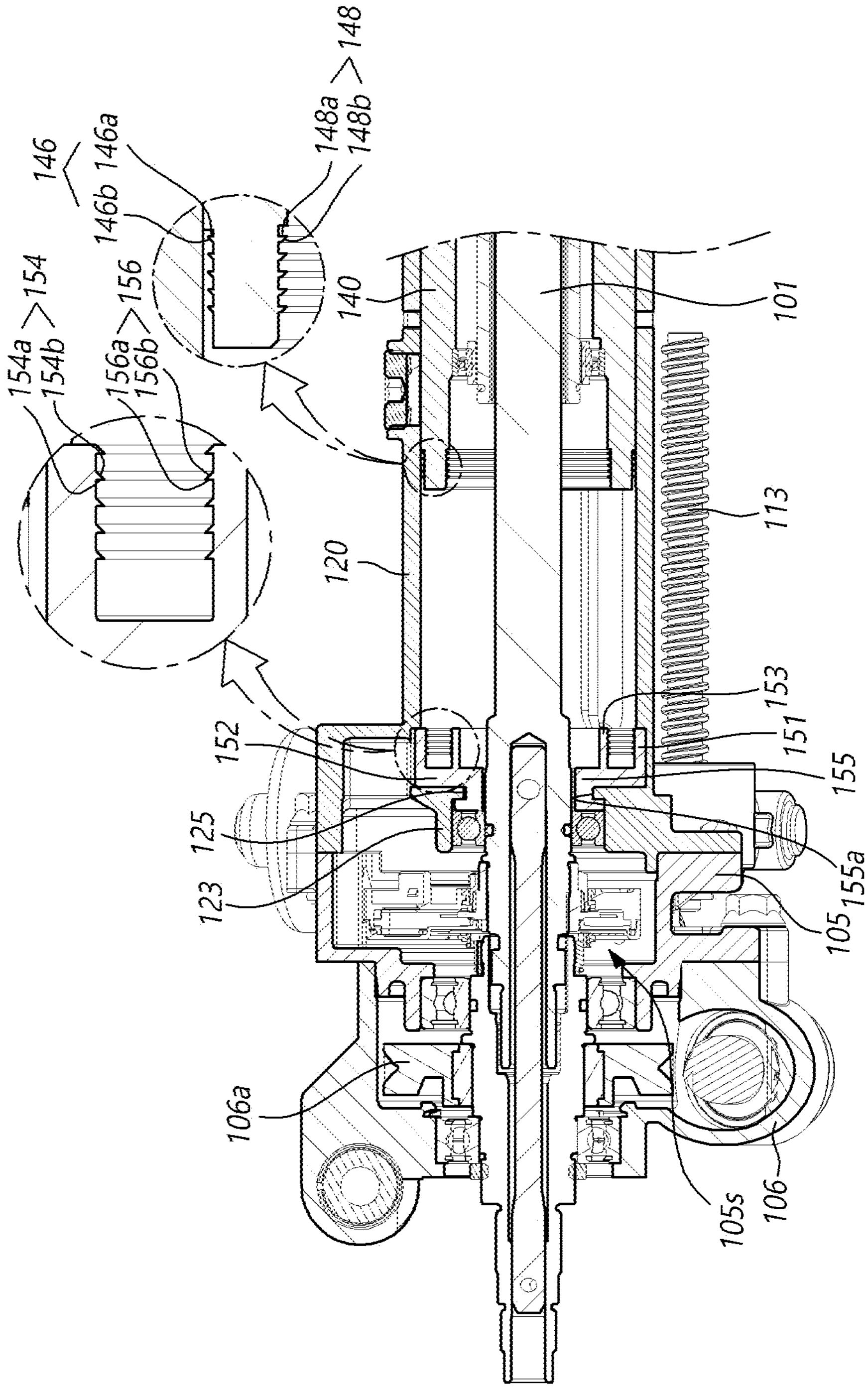

FIG. 1 is a perspective view of a vehicle steering column according to the present embodiments, FIG. 2 is a cross-sectional view of the vehicle steering column according to the present embodiments, FIGS. 3 to 5 are perspective views of the vehicle steering column according to the present embodiments, FIG. 6 is a cross-sectional view of the vehicle steering column according to the present embodiments, FIG. 7 is a perspective view of a vehicle steering column according to the present embodiments, and FIGS. 8 to 10 are cross-sectional views of the vehicle steering column according to the present embodiments.

In the detailed description of the embodiments below with reference to FIGS. 1 to 10, an upper side refers to a direction toward a steering wheel, and a lower side refers to the opposite direction. In addition, in stow-in and stow-out operations, the stow-in operation refers to the steering wheel moving downward so that an axial length of a steering column 100 decreases, and the stow-out operation refers to the steering wheel moving upward so that the axial length of the steering column 100 increases.

The vehicle steering column 100 according to the present embodiments includes a lower tube 120 fixed to a mounting bracket 103, a middle tube 130 slidably coupled to an inner side of the lower tube 120 and configured to be slidable in an axial direction of the vehicle steering column 100, a upper tube 140 having an inner side to which a steering shaft 101 is rotatably coupled and an outer side to which the middle tube 130 is coupled, the upper tube 140 configured to be slidable in the axial direction of the vehicle steering column 100, and a tube support member 150 coupled to an inner side of a lower end portion of the lower tube 120 and configured to support lower end portions of the middle tube 130 and the upper tube 140.

The mounting bracket 103 includes a fixing flange and a fixing hole for fixing the steering column 100 to the body of the vehicle, so that the steering column 100 is fixed to the body of the vehicle, and a steering wheel (not illustrated) is coupled to an upper end of the steering shaft 101 so that the driver may perform the steering.

In the steering column 100 according to these embodiments, the middle tube 130 is slidably coupled to the lower tube 120 so that an axial stow-in and stow-out movements are achieved.

Moreover, the upper tube 140 formed in a hollow shape and having an inner side to which the steering shaft 101 is rotatably coupled is inserted into the middle tube 130 so that the axial stow-in and stow-out movements are achieved.

In the present embodiments, the stow-in and stow-out movements include a telescope movement that adjusts the length of the steering column 100 and a stow movement of introducing the steering wheel into or out of a dashboard.

A motor 111 provided at the lower end of the lower tube 120 rotates a first screw 113*a* and a second screw 113*b*, and a first nut 117 coupled to the first screw 113*a* slides the middle tube 130 in the axial direction, and a second nut 115 coupled to the second screw 113*b* slides the upper tube 140 in the axial direction.

In addition, a long slot hole 121 is provided in the axial direction on the side surfaces of the lower tube 120 and the middle tube 130 so that the first nut 117 and the second nut 115 may move along the slot hole 121.

The axial stow-in and stow-out movements of the middle tube 130 and upper tube 140 include the telescopic movement or the stow movement operated by the driver.

A sensor housing 105 in which a torque angle sensor 105*s* is built is coupled to the lower end portion of the lower tube 120, and a reducer housing 106 that reduces the driving force of the motor 111 by a worm and a worm wheel 106*a* is coupled to the sensor housing 105.

In addition, as illustrated in FIGS. 2 and 3, the lower end portion of the lower tube 120 is provided with a cylinder portion 123 through which the steering shaft 101 passes, and a flange 125 formed radially is provided on the inner peripheral surface of the cylinder portion 123.

The outer peripheral surface of the cylinder portion 123 may be connected to an outer bulkhead 124 of the lower tube 120 by at least one connecting flange 123*a* to supplement the rigidity of the cylinder portion 123.

In addition, the tube support member 150 is coupled to the flange 125 to support the lower end portions of the upper tube 140 and the middle tube 130 in a case where the steering column is stowed in, absorb impact loads, prevent noise, and prevent rebound of the middle tube 130 and the upper tube 140.

Referring to FIGS. 4 and 5 together, the tube support member 150 includes a ring-shaped outer support portion 151 configured to support the lower end portion of the middle tube 130, a ring-shaped inner support portion 153 disposed the ring-shaped outer support portion 151 and configured to support the lower end portion of the upper tube 140, a bulkhead 152 having a shaft hole 152*a* through which the steering shaft 101 passes and connecting the ring-shaped outer support portion 151 and the ring-shaped inner support portion 153, and a flange fastening portion 155 extending axially from the bulkhead 152 and having a groove 155*a* into which the flange 125 of the cylinder portion of the lower tube 120 is inserted.

This tube support member 150 may have a first cut portion 157 in which the ring-shaped outer support portion 151, the ring-shaped inner support portion 153, and the bulkhead 152 are cut to communicate with the shaft hole 152*a* on one side.

Accordingly, in a case of assembling the tube support member 150 to the cylinder portion 123 of the lower tube 120, the outer diameter may be reduced before assembly, making assembly easier.

In addition, the flange fastening portion 155 may be provided with a second cut portion 159 having one side cut in the circumferential direction, and one or more second cut portions 159 may be provided.

Accordingly, in a case of assembling the tube support member 150 to the flange 125, the outer diameter of the flange fastening portion 155 may be reduced before assembly, and after assembly, the outer diameter of the flange fastening portion 155 may be expanded so that the tube support member 150 may be fixed without being detached from the flange 125.

In addition, an outer support protrusion 154 protruding radially inward is provided on the inner peripheral surface of the ring-shaped outer support portion 151, and a middle tube protrusion 131 supported by the outer support protrusion 154 is provided on the outer peripheral surface of the lower end portion of the middle tube 130.

Accordingly, in the point where the middle tube 130 is fully stowed in (see FIG. 6), the outer support protrusion 154 is restored after the middle tube protrusion 131 is stowed in while elastically deforming the outer support protrusion 154, and thus, the rebound of the middle tube 130 is prevented.

The outer support protrusion 154 includes an outer locking portion 154*a* extending vertically from the inner peripheral surface of the ring-shaped outer support portion 151, and an inclined surface 154*b* formed as an inclined surface from the end of the outer locking portion 154*a* to the inner peripheral surface of the ring-shaped outer support portion 151.

In addition, the corresponding middle tube protrusion 131 also has a protrusion locking portion 131*a* extending vertically from the outer peripheral surface, and a protrusion inclined portion 131*b* formed as an inclined surface from the end of the protrusion locking portion 131*a* to the outer peripheral surface of the middle tube 130.

Accordingly, at the point where the middle tube 130 is fully stowed in, in a case where the outer support protrusion 154 is restored after the middle tube protrusion 131 passes over the inclined surface 154*b* and is smoothly stowed in, the protrusion locking portion 131*a* of the middle tube protrusion 131 is supported by the outer locking portion 154*a* and the position thereof is fixed, thereby preventing the rebound of the middle tube 130.

In addition, an inner support protrusion 156 protruding radially outward is provided on the outer peripheral surface of the ring-shaped inner support portion 153, and an upper tube protrusion 141 supported by the inner support protrusion 156 is provided on the inner peripheral surface of the lower end portion of the upper tube 140.

Accordingly, at the point where the upper tube 140 is fully stowed in (see FIG. 6), the inner support protrusion 156 is restored after the upper tube protrusion 141 is stowed in while elastically deforming the inner support protrusion 156, and thus, the rebound of the upper tube 140 is prevented.

The inner support protrusion 156 includes an inner locking portion 156*a* extending vertically from the outer peripheral surface of the ring-shaped inner support portion 153, and an inclined surface 156*b* formed as an inclined surface from the end of the inner locking portion 156*a* to the outer peripheral surface of the ring-shaped inner support portion 153.

In addition, the corresponding upper tube protrusion 141 also has an extension locking portion 141*a* that extends vertically from the inner peripheral surface, and an extension inclined portion 141*b* that is formed as an inclined surface from the end of the extension locking portion 141*a* to the inner peripheral surface of the upper tube 140.

Accordingly, at the point where the upper tube 140 is fully stowed in, in a case where the inner support protrusion 156 is restored after the upper tube protrusion 141 passes over the inclined surface 156*b* and is smoothly stowed in, the extension locking portion 141*a* of the upper tube protrusion 141 is supported by the inner locking portion 156*a* and the position thereof is fixed, thereby preventing rebound of the upper tube 140.

In addition, referring to FIGS. 7 to 10 together, the vehicle steering column 100 according to the present embodiments includes the lower tube 120 that is coupled and fixed to the mounting bracket 103, the upper tube 140 that includes the inner side to which the steering shaft 101 is rotatably coupled and the outer side to which the lower tube 120 is coupled to slide in the axial direction, and the tube support member 150 that is coupled to the inner side of the lower end portion of the lower tube 120 and supports the lower end portion of the upper tube 140.

Here, the upper tube 140 is slidably coupled to the lower tube 120 to perform axial stow-in and stow-out movements, and the stow-in and stow-out movements include a telescope movement that adjusts the length of the steering column 100 and a stow movement of introducing the steering wheel into or out of a dashboard.

The lower tube 120, the upper tube 140, and the tube support member 150 may have the same features as those described in FIGS. 1 to 6, except for the features described below.

The motor 111 provided at the lower end of the lower tube 120 rotates a screw 113, a nut 114 coupled to the screw 113 slides the upper tube 140 in the axial direction, and an axially long slot hole 121 is provided on the side surface of the lower tube 120 so that the nut 114 may move along the slot hole 121.

The lower end portion of the lower tube 120 is provided with the cylinder portion 123 through which the steering shaft 101 passes, as illustrated in FIG. 3, and the flange 125 formed radially is provided on the inner peripheral surface of the cylinder portion 123.

Moreover, the tube support member 150 is coupled to the flange 125 to support the lower end portion of the upper tube 140 in a case where the steering column is stowed in.

As illustrated in FIGS. 4 and 5, the tube support member 150 includes the ring-shaped outer support portion 151 by which the outer peripheral surface of the upper tube 140 is supported, the ring-shaped ring-shaped inner support portion 153 which is disposed radially inside the ring-shaped outer support portion 151 and by which the inner peripheral surface of the upper tube 140 is supported, the bulkhead 152 having the shaft hole 152*a* through which the steering shaft 101 passes and connecting the ring-shaped outer support portion 151 and the ring-shaped inner support portion 153, and the flange fastening portion 155 which extends axially from the bulkhead 152 and has the groove 155*a* into which the flange 125 is inserted.

The tube support member 150 may have the first cut portion 157 in which the ring-shaped outer support portion 151, the ring-shaped inner support portion 153, and the bulkhead 152 are cut to communicate with the shaft hole 152*a*.

The flange fastening portion 155 may be provided with the second cut portion 159 having one side cut in the circumferential direction.

Referring to FIG. 8, the outer support protrusion 154 protruding radially inward may be provided on the inner peripheral surface of the ring-shaped outer support portion 151, and a first protrusion 146 supported by the outer support protrusion 154 may be provided on the outer peripheral surface of the lower end portion of the upper tube 140.

Accordingly, at the point where the upper tube 140 is fully stowed in, the outer support protrusion 154 is restored after the first protrusion 146 is stowed in while elastically deforming the outer support protrusion 154, and thus, the rebound of the upper tube 140 is prevented.

The outer support protrusion 154 includes the outer locking portion 154*a* extending vertically from the inner peripheral surface of the ring-shaped outer support portion 151, and the inclined surface 154*b* formed as an inclined surface from the end of the outer locking portion 154*a* to the inner peripheral surface of the ring-shaped outer support portion 151.

In addition, the corresponding first protrusion 146 also has a first locking portion 146*a* extending vertically from the outer peripheral surface, and a second inclined portion 146*b* formed as an inclined surface from the end of the first locking portion 146*a* to the inner peripheral surface of the upper tube 140.

Accordingly, at the point where the upper tube 140 is fully stowed in, in a case where the outer support protrusion 154 is restored after the first protrusion 146 passes over the inclined surface 154*b* and is smoothly stowed in, the first locking portion 146*a* of the first protrusion 146 is supported by the outer locking portion 154*a* and the position thereof is fixed, thereby preventing the rebound of the upper tube 140.

Moreover, as illustrated in FIG. 9, the inner support protrusion 156 protruding radially outward is provided on the outer peripheral surface of the ring-shaped inner support portion 153, and a second protrusion 148 supported by the inner support protrusion 156 may be provided on the inner peripheral surface of the lower end portion of the upper tube 140.

Accordingly, at the point where the upper tube 140 is fully stowed in, the inner support protrusion 156 is restored after the second protrusion 148 is stowed in while elastically deforming the inner support protrusion 156, and thus, the rebound of the upper tube 140 is prevented.

The inner support protrusion 156 includes the inner locking portion 156*a* extending vertically from the outer peripheral surface of the ring-shaped inner support portion 153, and the inclined surface 156*b* formed as an inclined surface from the end of the inner locking portion 156*a* to the outer peripheral surface of the ring-shaped inner support portion 153.

In addition, the corresponding second protrusion 148 also has a second locking portion 148*a* that extends vertically from the inner peripheral surface, and a second inclined portion 148*b* that is formed as an inclined surface from the end of the second locking portion 148*a* to the inner peripheral surface of the upper tube 140.

Accordingly, at the point where the upper tube 140 is fully stowed in, in a case where the inner support protrusion 156 is restored after the second protrusion 148 passes over the inclined surface 156*b* and is smoothly stowed in, the second locking portion 148*a* of the second protrusion 148 is supported by the inner locking portion 156*a* and the position thereof is fixed, thereby preventing rebound of the upper tube 140.

In addition, as illustrated in FIG. 10, an outer support protrusion 154 protruding radially inwardly may be provided on the inner peripheral surface of the ring-shaped outer support portion 151, the first protrusion 146 supported by the outer support protrusion 154 may be provided on the outer peripheral surface of the lower end portion of the upper tube 140, an inner support protrusion 156 protruding radially outwardly may be provided on the outer peripheral surface of the ring-shaped inner support portion 153, and the second protrusion 148 supported by the inner support protrusion 156 may be provided on the inner peripheral surface of the lower end portion of the upper tube 140.

In this case, the outer support protrusion 154 may include the outer locking portion 154*a* extending vertically from the inner peripheral surface of the ring-shaped outer support portion 151, and the inclined surface 154*b* formed as an inclined surface from the end of the outer locking portion 154*a* to the inner peripheral surface.

The inner support protrusion 156 may include the inner locking portion 156*a* extending vertically from the outer peripheral surface of the ring-shaped inner support portion 153, and the inclined surface 156*b* formed as an inclined surface from the end of the inner locking portion 156*a* to the outer peripheral surface.

The vehicle steering column 100 according to the present embodiments may be applied not only to a general vehicle steering column in which steering is performed by the driver, but also to a vehicle steering column in which autonomous driving is possible.

In particular, referring to FIGS. 1 to 6 applied to a steer-by-wire type steering device capable of autonomous driving, the torque angle sensor 105*s* that detects in a case where the driver operates the steering wheel sends an electric signal to an electronic control device 109 so that a steering wheel motor 107 and a pinion shaft motor (not illustrated) are operated.

The electronic control device 109 controls the steering wheel motor 107 and the pinion shaft motor based on the electric signals transmitted from the torque angle sensor 105*s* and other electric signals transmitted from various sensors mounted on the vehicle.

The steering wheel motor 107 is connected to a reduction gear housing 106 that reduces the rotational speed of the motor, and during normal driving, the steering shaft motor 220, a reaction force is provided to the steering wheel so that the driver may feel a steering reaction force in the opposite direction in a case where the driver operates the steering wheel, and during autonomous driving, steering is performed by the control of the electronic control device 109 without the intervention of the driver's will.

In addition, a rotation angle limiting member 101*s* for limiting the rotation angle of the steering shaft in the steer-by-wire type steering device is provided at the lower end of the reduction gear housing 106.

According to these embodiments, a telescopic movement for adjusting an axial length of the vehicle steering column and a stow movement for introducing the steering wheel into or out of the dashboard may be performed more quickly and stably.

In addition, according to the present embodiments, it is possible to provide sufficient stability and convenience to a driver by performing stable stow-in and stow-out operations by preventing rebound of the upper tube 140 or the middle tube 130 at the point of full stow-in of the steering column.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments illustrated, but is to be accorded the widest scope consistent with the claims.

What is claimed is:

1. A vehicle steering column comprising:

a lower tube fixed to a mounting bracket;

a middle tube slidably coupled to an inner side of the lower tube and configured to be slidable relative to the lower tube in an axial direction of the vehicle steering column;

an upper tube having an inner side to which a steering shaft is rotatably coupled and an outer side to which the middle tube is coupled, the upper tube configured to be slidable in the axial direction of the vehicle steering column; and a tube support member coupled to an inner side of a lower end portion of the lower tube and configured to support lower end portions of the middle tube and the upper tube.

2. The vehicle steering column of claim 1, wherein the lower end portion of the lower tube has a cylinder portion through which the steering shaft passes, the cylinder portion has a flange radially extending from an inner surface of the cylinder portion, and the tube support member is coupled to the flange of the cylinder portion of the lower tube.

3. The vehicle steering column of claim 2, wherein the tube support member includes:

a ring-shaped outer support portion configured to support the lower end portion of the middle tube;

a ring-shaped inner support portion disposed in the ring-shaped outer support portion and configured to support the lower end portion of the upper tube;

a bulkhead having a shaft hole through which the steering shaft passes and connecting the ring-shaped outer support portion and the ring-shaped inner support portion; and a flange fastening portion extending axially from the bulkhead and having a groove into which the flange of the cylinder portion of the lower tube is inserted.

4. The vehicle steering column of claim 3, wherein the tube support member has a first cut portion in which the ring-shaped outer support portion, the ring-shaped inner support portion, and the bulkhead are cut.

5. The vehicle steering column of claim 3, wherein the flange fastening portion of the tube support member has one or more second cut portions.

6. The vehicle steering column of claim 3, wherein the ring-shaped outer support portion of the tube support member has an outer support protrusion protruding radially inward from an inner surface of the ring-shaped outer support portion, and the middle tube has a middle tube protrusion supported by the outer support protrusion of the tube support member and protruding from an outer surface of the lower end portion of the middle tube.

7. The vehicle steering column of claim 6, wherein the outer support protrusion of the ring-shaped outer support portion of the tube support member includes:

an outer locking portion extending from the inner surface of the ring-shaped outer support portion of the tube support member in a direction toward an axis of the steering shaft; and an inclined surface extending from an end of the outer locking portion to the inner surface of the ring-shaped outer support portion.

8. The vehicle steering column of claim 3, wherein the ring-shaped inner support portion of the tube support member has an inner support protrusion protruding radially outward from the outer surface of the ring-shaped inner support portion, and the upper tube has an upper tube protrusion supported by the inner support protrusion of the tube support member and protruding from an inner surface of the lower end portion of the upper tube.

9. The vehicle steering column of claim 8, wherein the inner support protrusion of the ring-shaped inner support portion of the tube support member includes:

an inner locking portion extending from the outer surface of the ring-shaped inner support portion of the tube support member in a direction away from an axis of the steering shaft; and an inclined surface extending from an end of the inner locking portion to the outer surface of the ring-shaped inner support portion.

10. A vehicle steering column comprising:

a lower tube fixed to a mounting bracket;

an upper tube having an inner side to which a steering shaft is rotatably coupled and an outer side to which the lower tube is coupled, the upper tube configured to be slidable in an axial direction of the vehicle steering column; and a tube support member coupled to an inner side of a lower end portion of the lower tube, configured to support a lower end portion of the upper tube, and having a hole in which the steering shaft is disposed, wherein an inner diameter of the hole of the tube support member is smaller than an inner diameter of the upper tube such that the lower end portion of the upper tube is supported by the tube support member.

11. The vehicle steering column of claim 10, wherein the lower end portion of the lower tube has a cylinder portion through which the steering shaft passes, the cylinder portion has a flange radially extending from an inner surface of the cylinder portion, and the tube support member is coupled to the flange of the cylinder portion.

12. A vehicle steering column comprising:

a lower tube fixed to a mounting bracket;

an upper tube having an inner side to which a steering shaft is rotatably coupled and an outer side to which the lower tube is coupled, the upper tube configured to be slidable in an axial direction of the vehicle steering column; and a tube support member coupled to an inner side of a lower end portion of the lower tube, configured to support a lower end portion of the upper tube wherein the lower end portion of the lower tube has a cylinder portion through which the steering shaft passes, the cylinder portion has a flange radially extending from an inner surface of the cylinder portion, and the tube support member is coupled to the flange of the cylinder portion, wherein the tube support member includes:

a ring-shaped outer support portion configured to support an outer surface of the upper tube;

a ring-shaped inner support portion disposed in the ring-shaped outer support portion and configured to support an inner surface of the upper tube;

a bulkhead having a shaft hole through which the steering shaft passes and connecting the ring-shaped outer support portion and the ring-shaped inner support portion; and a flange fastening portion extending axially from the bulkhead and having a groove into which the flange of the cylinder portion of the lower tube is inserted.

13. The vehicle steering column of claim 12, wherein the tube support member has a first cut portion in which the ring-shaped outer support portion, the ring-shaped inner support portion, and the bulkhead are cut.

14. The vehicle steering column of claim 12, wherein the flange fastening portion has one or more second cut portions.

15. The vehicle steering column of claim 12, wherein the ring-shaped outer support portion of the tube support member has an outer support protrusion protruding radially inward from an inner surface of the ring-shaped outer support portion, and the upper tube has a first protrusion supported by the outer support protrusion of the tube support member and protruding from an outer surface of the lower end portion of the upper tube.

16. The vehicle steering column of claim 15, wherein the outer support protrusion of the ring-shaped outer support portion of the tube support member includes:

an outer locking portion extending from the inner surface of the ring-shaped outer support portion of the tube support member in a direction toward an axis of the steering shaft; and an inclined surface extending from an end of the outer locking portion to the inner surface of the ring-shaped outer support portion.

17. The vehicle steering column of claim 12, wherein the ring-shaped inner support portion of the tube support member has an inner support protrusion protruding radially outward from the outer surface of the ring-shaped inner support portion, and the upper tube has a second protrusion supported by the inner support protrusion of the tube support member and protruding from an inner surface of the lower end portion of the upper tube.

18. The vehicle steering column of claim 17, wherein the inner support protrusion of the ring-shaped inner support portion of the tube support member includes:

an inner locking portion extending from the outer surface of the ring-shaped inner support portion of the tube support member in a direction away from an axis of the steering shaft; and an inclined surface extending from an end of the inner locking portion to the outer surface of the ring-shaped inner support portion.

19. The vehicle steering column of claim 12, wherein:

the ring-shaped outer support portion of the tube support member has an outer support protrusion protruding radially inward from an inner surface of the ring-shaped outer support portion, the upper tube has a first protrusion supported by the outer support protrusion of the tube support member and protruding from an outer surface of the lower end portion of the upper tube, the ring-shaped inner support portion of the tube support member has an inner support protrusion protruding radially outward from the outer surface of the ring-shaped inner support portion, and the upper tube has a second protrusion supported by the inner support protrusion of the tube support member and protruding from an inner surface of the lower end portion of the upper tube.

20. The vehicle steering column of claim 19, wherein:

the outer support protrusion of the ring-shaped outer support portion of the tube support member includes:

an outer locking portion extending from the inner surface of the ring-shaped outer support portion of the tube support member in a direction toward an axis of the steering shaft; and a first inclined surface extending from an end of the outer locking portion to the inner surface of the ring-shaped outer support portion, and the inner support protrusion of the ring-shaped inner support portion of the tube support member includes:

an inner locking portion extending from the outer surface of the ring-shaped inner support portion of the tube support member in a direction away from an axis of the steering shaft; and a second inclined surface extending from an end of the inner locking portion to the outer surface of the ring-shaped inner support portion.

* * * * *